US010498502B2

(12) United States Patent
Mildh et al.

(10) Patent No.: US 10,498,502 B2
(45) Date of Patent: Dec. 3, 2019

(54) METHOD AND APPARATUS FOR SHARING RADIO NETWORK INFRASTRUCTURE USING CARRIER AGGREGATION

(75) Inventors: Gunnar Mildh, Sollentuna (SE); Gabor Fodor, Hässelby (SE); Tomas Hedberg, Stockholm (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 496 days.

(21) Appl. No.: 14/009,939

(22) PCT Filed: Apr. 13, 2011

(86) PCT No.: PCT/SE2011/050450
§ 371 (c)(1),
(2), (4) Date: Oct. 4, 2013

(87) PCT Pub. No.: WO2012/141628
PCT Pub. Date: Oct. 18, 2012

(65) Prior Publication Data
US 2014/0023016 A1    Jan. 23, 2014

(51) Int. Cl.
*H04L 5/00* (2006.01)
*H04W 28/18* (2009.01)
(Continued)

(52) U.S. Cl.
CPC ............ *H04L 5/0037* (2013.01); *H04L 5/001* (2013.01); *H04L 5/0096* (2013.01); *H04W 28/18* (2013.01);
(Continued)

(58) Field of Classification Search
None
See application file for complete search history.

(56) References Cited

U.S. PATENT DOCUMENTS

2010/0227623 A1* 9/2010 De Pasquale ......... H04W 24/02
455/452.1
2010/0261473 A1* 10/2010 Al-Bakri ................. H04W 8/02
455/435.2
(Continued)

FOREIGN PATENT DOCUMENTS

EP       2262335 A1    12/2010

OTHER PUBLICATIONS

"3GPP TS 23.402 V10.3.0 (Mar. 2011)" "3rd Generation Partnership Project; Technical Specification Group Services and System Aspects; Architecture enhancements for non-3GPP accesses (Release 10)"; Mar. 28, 2011; 3GPP; 10.3.0.*
(Continued)

*Primary Examiner* — Kodzovi Acolatse
(74) *Attorney, Agent, or Firm* — Patent Portfolio Builders, PLLC (57) ABSTRACT

This disclosure relates a method and a base station for network sharing using carrier aggregation. The base station of a multi-carrier system comprises a multiple of cells, where each cell corresponds to a carrier that is associated with a PLMN. The base station receives (302, S-424, S-516, S-616) a UE request with information of a UE (402, 502, 602), where a first cell of said multiple of cells corresponds to a first carrier. The base station determines (304, S-428, S-520, S-626) based on base station settings and/or UE information, whether an other carrier associated with a different PLMN is available to said UE. If so, the base station sends (306, S-430, S-440, S-524, S-530) a resource configuration message destined for said UE (402, 502, 602), enabling said UE to configure said other carrier as a SCC. Better coverage, peak rates and capacity, without suffering from the drawbacks of existing RAN sharing techniques, are provided.

20 Claims, 5 Drawing Sheets

(51) Int. Cl.
*H04W 72/04* (2009.01)
*H04W 36/00* (2009.01)

(52) U.S. Cl.
CPC ...... *H04W 36/0055* (2013.01); *H04W 72/048* (2013.01); *H04W 72/0453* (2013.01)

(56) References Cited

U.S. PATENT DOCUMENTS

| | | | | |
|---|---|---|---|---|
| 2011/0065436 A1* | 3/2011 | Svedevall | ............. | H04W 36/22 455/436 |
| 2011/0070880 A1* | 3/2011 | Song | ............. | H04L 5/001 455/423 |
| 2011/0171926 A1* | 7/2011 | Faccin | ............. | H04W 48/18 455/404.1 |
| 2011/0237250 A1* | 9/2011 | Horn et al. | ............. | 455/433 |
| 2012/0082100 A1* | 4/2012 | Ahmadi | ............. | H04W 72/1215 370/329 |
| 2012/0302196 A1* | 11/2012 | Chin | ............. | H04W 76/045 455/404.1 |
| 2013/0022023 A1* | 1/2013 | Aydin | ............. | H04W 36/28 370/331 |
| 2013/0051214 A1* | 2/2013 | Fong | ............. | H04W 24/10 370/216 |
| 2013/0107862 A1* | 5/2013 | Yang | ............. | H04L 5/001 370/331 |
| 2013/0183978 A1* | 7/2013 | Keskitalo et al. | ............. | 455/436 |
| 2013/0183979 A1* | 7/2013 | Chen | ............. | H04W 36/30 455/436 |
| 2013/0239194 A1* | 9/2013 | Raleigh | ............. | G06Q 10/06375 726/7 |
| 2013/0329692 A1* | 12/2013 | Vrzic | ............. | H04W 72/0453 370/329 |
| 2013/0343324 A1* | 12/2013 | Lin | ............. | H04L 5/001 370/329 |

OTHER PUBLICATIONS

Unknown, Author. "3rd Generation Partnership Project; Technical Specification Group Radio Access Network; Evolved Universal Terrestrial Radio Access (E-UTRA) and Evolved Universal Terrestrial Radio Access Network (E-TRAN); Overall Description; Stage 2 (Release 10)." Mar. 2011. 3GPP TS 36.300, V.10.3.0.

Hong, Wei-Chih et al. "Improving the Autonomous Component Carrier Selection for Home eNodesBs in LTE-Advanced." Consumer Communications and Networking Conference (CCNC). Jan. 9, 2011 IEEE. pp. 627-631.

Frisanco T. et al. "Infrastructure Sharing and Shared Operations for Mobile Network Operators From a Deployment and Operations View." 2008, Network Operations and Management Symposium. IEEE Piscataway, NJ. pp. 129-136.

* cited by examiner

METHOD AND APPARATUS FOR SHARING RADIO NETWORK INFRASTRUCTURE USING CARRIER AGGREGATION

TECHNICAL FIELD

This disclosure pertains in general to the field of network sharing, and more particularly to a method and a base station for network sharing using carrier aggregation.

BACKGROUND

The usage of mobile broadband services using cellular networks has shown a significant increase during recent years. In parallel, there is an ongoing evolution of third and fourth generation cellular communication networks such as High Speed Packet Access, Long Term Evolution (LTE), and Worldwide Interoperability for Microwave Access in order to support an ever increasing performance with regards to capacity, peak bit rates and coverage. Operators deploying these networks are faced with a number of challenges, e.g. related to site and transport costs, and availability, as well as lack of wireless spectrum. Many different techniques are considered for meeting these challenges and for providing cost efficient mobile broadband.

One option available to the operators is to use shared network infrastructure and sites, i.e. when multiple cellular operators agree to deploy their network together. This is beneficial since it reduces the total deployment costs, and may further provide benefits due to pooling of the available spectrum. The drawback with network sharing in its current form is that it requires significant cooperation between the operators sharing the network since the network configuration is common for the part of the network that is shared, making it difficult to differentiate the treatment of users from each operator. This also makes interaction, e.g. handover, between shared parts and non-shared parts more complex, since the shared part needs to interact with a multiple of non-shared networks.

The support for network sharing has recently been enhanced in the third Generation Partnership Project (3GPP) Universal Terrestrial Radio Access Network (UTRAN) and Evolved-UTRAN standards. The standards allow various scenarios for network sharing, but it is expected that a common scenario will be when the Radio Access Network (RAN) is shared and each operator has its own Core Network (CN). This scenario is called Multi-Operator Core Network (MOCN) in 3GPP. From a technical point of view the MOCN configuration uses the multi-to-multi connectivity of the Iu and S1 interfaces between the Radio Network Controller (RNC) and CN, and the evolved Node B (eNB) and the CN, respectively. This makes it possible to connect a Radio Access Network (RAN) node, e.g. RNC or eNB, to multiple CN nodes, e.g. Serving General Packet Radio Service Support Node and Mobile Management Entity (MME), belonging to different operators. The RAN will in this configuration broadcast one Public Land Mobile Network (PLMN) identity for each operator sharing the RAN. The UE will at initial attach select which PLMN it wants to connect to and the RAN will make sure that the initial attach signaling is routed to the correct operators CN. Once the UE has been assigned a CN node there are also mechanisms making it possible for the RAN and CN to route subsequent signaling related to this UE to the same CN node. Besides the list of PLMN IDs, most system information broadcasted on the cell broadcast channels in the shared RAN is common for all operators sharing the RAN.

Another network sharing configuration which may be considered is the, so called, Multi-Operator Random Access Network (MORAN) configuration where operators share the physical network equipment but does not share the spectrum, i.e. each operator use different carriers. The advantage with the MORAN configuration is that each operator has full control over the configuration of broadcast parameters used in their spectrum, giving more freedom to have operator specific configurations. The drawback however is that the operators are not able to benefit from spectrum sharing leading to lower utilization of radio resource and lower network capacity, as compared to MOCN. The MORAN configuration has no standard impacts since the traffic from different operators are handled on separate carriers.

Another option for increasing the capacity and peak rates in 3GPP cellular networks is to use carrier aggregation. The principle for carrier aggregation is that a given UE may be served by multiple carriers at the same time, while it was previously only possible for a UE to use one carrier at a given time.

Figure 1:
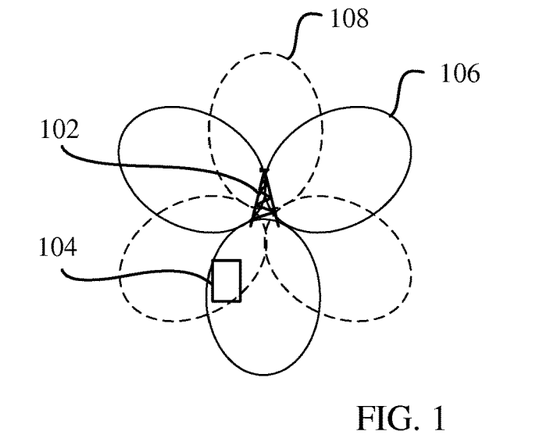
FIG. 1 illustrates a deployment scenario for carrier aggregation according to the prior art.

FIG. 1 illustrates a potential deployment scenario for carrier aggregation of the prior art. FIG. 1 further illustrates a base station 102 near which a UE 104 is located. Further, antennas of the base station are directed to define the coverage of a first carrier 106 of a first PLMN and the coverage of a second carrier 108 of a second PLMN. The UE is located in an area within the coverage of both the first carrier and the second carrier.

Carrier aggregation leads to that the maximum bit rate for a given UE may be increased and to an increase in the network capacity due to better resource utilization. The principle adopted for carrier aggregation in 3GPP is that the UE is assigned a Primary Component Carrier (PCC) on which it receives most of the control information. Transmission of data may however be performed on both the primary component carrier and on one or more Secondary Component Carriers (SCCs). Carrier aggregation in LTE may operate both in modes where the UE receives downlink/uplink scheduling commands on the primary component carrier only, as well in modes where the UE receives scheduling commands on all component carriers. Regardless of the mode of operation, the UE will only need to read the broadcast channel in order to acquire system information parameters on the PCC. System information related to the SCCs may be provided to the UE in dedicated Radio Resource Control (RRC) messages.

As mentioned above one drawback of supporting RAN sharing with spectrum sharing is that the operators need to have common parameter settings, e.g. system information setting, in the shared part of their network. Due to different loads, and service mix, for instance, it is desirable for operators to apply operator specific configurations.

It is of course possible to share the physical equipment only but then assign at least one carrier to each operator to use on its own, i.e. the MORAN configuration. This would enable each operator to apply operator specific configurations. The drawback would however be that there is no sharing of the spectrum between the operators.

There is thus a need to overcome the drawbacks of prior art configurations.

SUMMARY

An object of the present disclosure is provide operators to have their own parameter settings for their own User Equipments (UEs) while benefitting from spectrum sharing between operators.

This object is attained by using at least two carriers associated with different Public Land Mobile Networks (PLMNs) for communication between a base station and a UE.

According to one aspect of this disclosure, a method in a base station for controlling of resource allocation in a multi-carrier system, is provided. The multi-carrier system comprises a multiple of cells controlled by the base station, where each cell of said multiple of cells corresponds to a carrier that is associated with a PLMN.

The method comprises receiving a UE request comprising information of a UE in a connected mode, where a first cell of said multiple of cells corresponds to a first carrier, either comprises the UE or receives the UE in a handover procedure. The method further comprises determining based on base station settings and/or UE information, whether an other carrier associated with a different PLMN is available to said UE.

The method also comprises when so being the case, sending a resource configuration message destined for said UE, enabling said UE to configure said other carrier as a Secondary Component Carrier (SCC).

The method in a base station may also comprise sending an uplink and/or downlink scheduling assignment for resource allocation on said SCC.

The method in a base station may further comprise sending downlink data on said SCC and/or receiving uplink data on said SCC, subsequent to the sending a resource configuration message.

According to another aspect of this disclosure, a base station for controlling of resource allocation in a multi-carrier system, is disclosed. The multi-carrier system comprises a multiple of cells controlled by the base station, where each cell of said multiple of cells corresponds to a carrier that is associated with a PLMN. The base station comprises a transceiver that is configured to receive a UE request comprising information of a UE in a connected mode, where a first cell of said multiple of cells corresponds to a first carrier, either comprises the UE or receives the UE in a handover procedure. The base station also comprises a processor that is configured to determine based on base station settings and/or UE information, whether an other carrier associated with a different PLMN is available to said UE. When so being the case is the transceiver further configured to send a resource configuration message destined for said UE, enabling said UE to configure said other carrier as a SCC.

The base station settings of which the processor is configured to determine whether an other carrier is available to said SCC, may comprise base station policy settings.

The base station policy settings of the base station may comprise settings concerning at least one of: load based policies, UE or user subscription based policies, charging based policies and equal use policies.

Embodiments provide network sharing using carrier aggregation for macro base stations, such as eNBs and NBs, as well as for home NBs and home eNBs. This is an advantage since it opens up for new business cases where third party operators deploy networks of base stations which may be shared by multiple operators.

Further, technical advantageous are better coverage, peak rates and capacity, without suffering from the drawbacks of existing RAN sharing techniques.

BRIEF DESCRIPTION OF DRAWINGS

These and other aspects, features and advantages of which this disclosure is capable of, will be apparent and elucidated from the following description of embodiments of this disclosure, reference being made to the accompanying drawings, in which.

ABBREVIATIONS

3GPP 3rd Generation Partnership Project
BS Base Station
eNB Evolved Node B
E-UTRAN Evolved Universal Terrestrial Radio Access Network
HO Handover
LTE Long Term Evolution
MME Mobility Management Entity
NAS Non-Access Stratum
OAM Operation, Administration and Maintenance
PCC Primary Component Carrier
PLMN Public Land Mobile Network
RAN Radio Access Network
RNC Radio Network Controller
RRC Radio Resource Controller
SCC Secondary Component Carrier
UE User Equipment

DETAILED DESCRIPTION

One concept of this disclosure is to use carrier aggregation in a network sharing scenario in such a way that it allows each operator to have their own PCC using operator specific configuration and policies, and share allocation resources among the operators using SCCs. Each SCC may well be used as a PPC by another operator. In this way each operator may have their own parameter setting by using system information parameters for their own UEs, while still benefiting from resource pooling, e.g. spectrum sharing, between operators.

Using network sharing based on carrier aggregation requires policies on how the resources on the different carriers are shared between UEs from different operators. Such policies may be for example load based, subscription based, charging based or based on equal usage. In addition, these policies need to be configured in the base station.

This enables operators to use allocation resources on carriers belonging to other operators, without the need to read the broadcast channel in order to acquire system information parameters on said carriers.

Figure 2A:
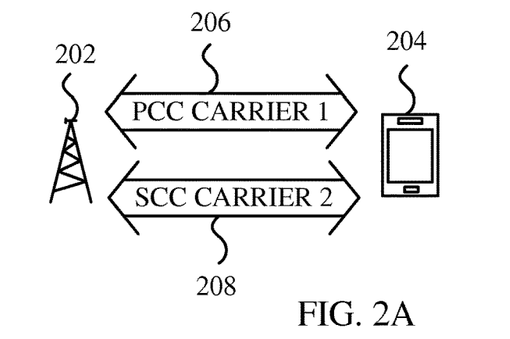
FIG. 2 schematically illustrates network sharing configurations according to some embodiments of this disclosure.
Figure 2B:
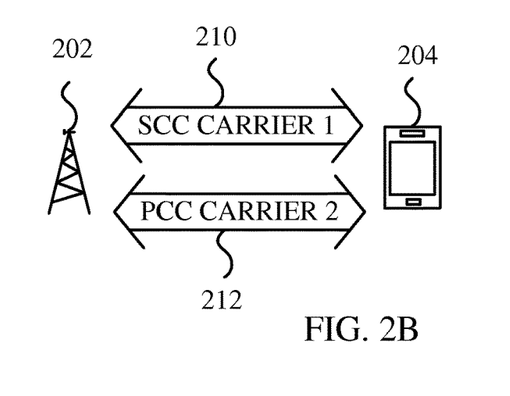

FIGS. 2A and 2B schematically illustrate configurations of a base station 202 controlling a UE 204, according to embodiments of this disclosure. The base station 202 may be an Evolved-Universal Terrestrial Radio Access Network Node B (eNB) of Long Term Evolution (LTE) or a Node B within Universal Terrestrial Radio Access Network of Wideband Code Division Multiple Access.

FIG. 2A illustrates a configuration that is used by an operator A. Using this configuration, carrier 1 is a PCC 206, whereas carrier 2 is a SCC 208.

FIG. 2B illustrates a configuration that is used by an operator B. Using this second configuration, carrier 1 is a SCC 210, whereas carrier 2 is a PCC 212.

In each configuration the base station 202 thus supports two downlink and/or uplink carriers. The base station is configured such that it supports two different operators and hence broadcasts system information on two different PLMNs. Each operator uses a specific carrier as a PCC with potentially carrier-specific configuration. It is pointed out that the number of PLMNs, which here is 2, is merely an example of the possible number. A similar configuration may thus be applied to other cases with more than 2 PLMNs as well.

Another possible configuration is to use a carrier as a SCC, which carrier no PLMN uses as PCC. One example of such a configuration would be a configuration having three individual PCCs and one shared carrier used as SCC for all PLMNs.

Moreover, the SCC may use both licensed and unlicensed or license exempt spectrum. It is noted that license exempt spectrum is also called white space. In addition, the SCC and PCC do not need to use the same spectrum band, transmit power, bandwidth.

User Equipments supporting carrier aggregation would camp on the PCC of the operator to which each UE has a subscription with. The base station may be further configured to transmit data to these UEs both on the PCC and SCC. Operator specific control parameters may however only be transmitted on the respective PCC.

UEs that do not support carrier aggregation would only use the carrier belonging to the operator with which the respective UE has a subscription. The base station would in this case only transmit or receive data or signaling on this carrier.

Figure 3:
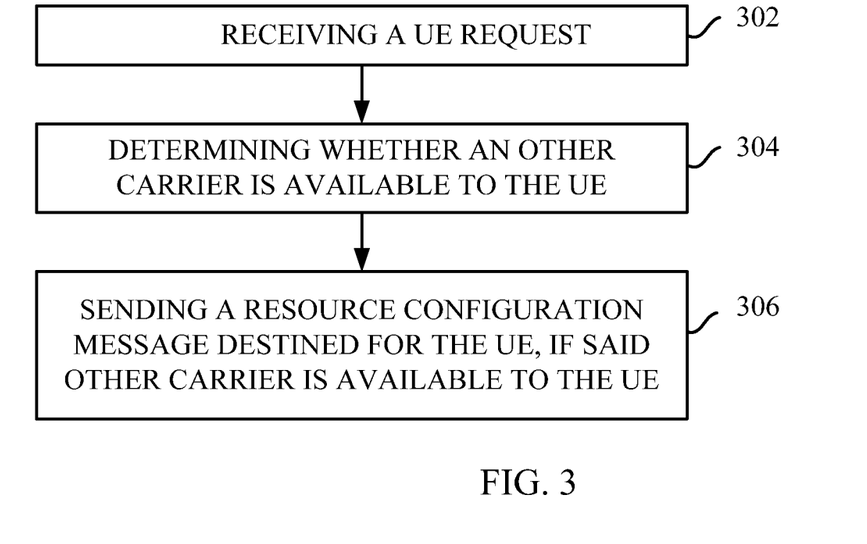
FIG. 3 presents a flow-chart of a method according to an embodiment of this disclosure.

FIG. 3 presents a flow-chart of a method in a base station for controlling of resource allocation in a multi-carrier system that comprises a multiple of cells controlled by the base station. Each cell of these multiple of cells corresponds to a carrier that is associated with a PLMN. The method comprises receiving 302 a UE request comprising information of a UE in a connected mode, where a first cell of said multiple of cells corresponds to a first carrier, either comprises the UE or receives the UE in handover procedure. The method also comprises determining 304 based on base station settings and/or UE information, whether an other carrier associated with a different PLMN is available to said UE. In addition, the method comprises, when so being the case, sending 306 a resource configuration message destined for said UE, enabling said UE to configure said other carrier as a SCC.

It is thus clear that the SCC is associated with a PLMN different from the PLMN with which the PCC is associated.

Figure 4:
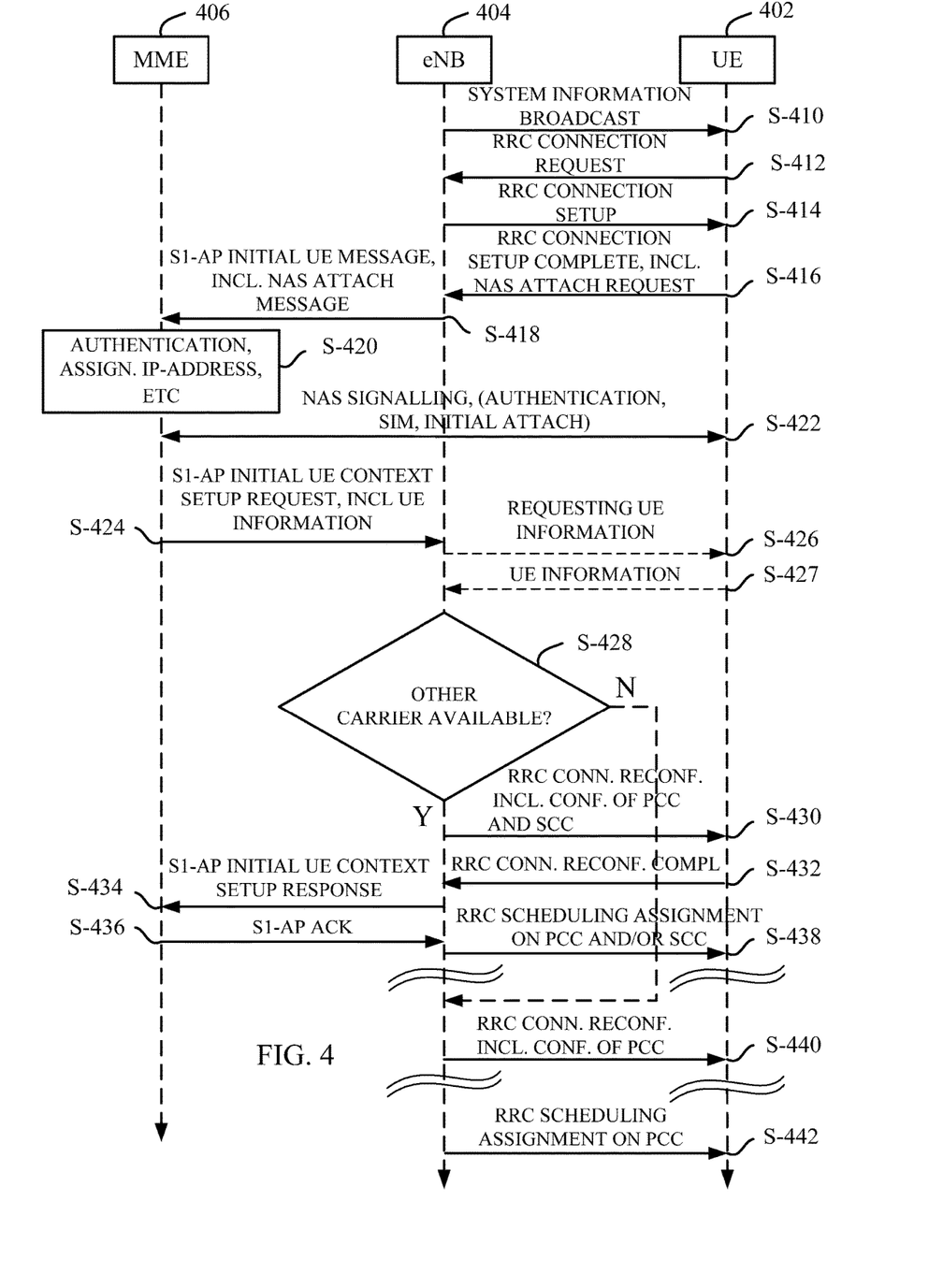
FIGS. 4-6 present signaling type-diagrams related to embodiments of this disclosure.

FIG. 4 illustrates a signaling type diagram of signaling between a Mobility Management Entity (MME) 406, an eNB 404 and a UE 402, related to the method in a base station for controlling of resource allocation in a multi-carrier system, according to some embodiments of this disclosure.

In a first signaling step, S-410, eNB 404 broadcasts system information to a multiple of UEs, comprising UE 402. Based on the received system information the UE 402 sends S-412 a Radio Resource Control (RRC) connection request to the eNB 404. The eNB 404 responds to the RRC connection request with a RRC connection setup as sent to the UE 402 in S-414. A RRC connection setup complete is then sent S-416 by the UE 402 to the eNB 404. From this point in time is hence the UE 402 in a RRC connected mode.

Moreover, the RRC connection setup complete as sent comprises a Non-Access Stratum (NAS) attach request. Alternatively, a NAS service request may be comprised in the RRC connection setup complete.

Herein, the eNB 404 then forwards S-418 the NAS attach message in an Initial UE message over the S1-Application Protocol (AP) to the MME 406. Based on the received S1-AP Initial UE message, the MME here checks the UE identity, controls S-420 authentication of the UE, obtains subscription information from a database, and assigns an IP-address to the UE.

Thereafter NAS signaling S-422 between the MME 406 and the UE 402 is performed. This NAS signaling typically concerns authentication of the UE, and subscriber identity module information, among others.

The MME 406 thereafter sends S-424 a S1-AP Initial UE context setup request to the eNB 404, to establish a UE context. This S1-AP initial UE context setup request comprises UE information. The eNB 404 hence receives UE information from the MME 406. The eNB 404 may also send a request S-426 for UE information to the UE 402. The eNB 404 may thus also receive UE information in S-427 from the UE.

The UE would here use one or more carriers belonging to one or the same operator. The eNB 404 now determines S-428 whether at least one other carrier, belonging to another carrier, is available to the UE 402 based on base station settings and/or UE information.

If at least one other carrier, belonging to another operator, is available to the UE 402, the eNB 404 sends S-430 a RRC connection reconfiguration message for configuration of PCC and SCC to the UE 402. This enables the UE to use at least one SCC in addition to the carrier for which it received broadcasted system information in S-410, which carrier is now denoted PCC. After RRC connection reconfiguration, the UE 402 sends S-432 a RRC connection complete message to the eNB 404. Thereafter the eNB 404 sends S-434 a S1-AP Initial UE context setup response to the MME 406, after which the MME 406 responses S-436 to the eNB 404 with a S1-AP acknowledgement.

The eNB 404 may now send S-438 a RRC scheduling assignment on PCC and/or SCC for resource allocation on SCC. This scheduling assignment may be either an uplink and/or a downlink scheduling assignment.

It is added that resource allocation may of course also be made on the carrier for which system information was broadcasted, i.e. the PCC. It may alternatively be another carrier, for instance in the case a handover procedure is performed. Further down below, a handover scenario will be discussed in more detail.

It should be pointed out that the eNB 404 may now use the additional available resources on carrier belonging to other operators, and send downlink data on said SCC and/or receive uplink data on said SCC, through which the increase peak-rate, coverage etc may be achieved.

In the case it is determined by the eNB 404 in S-428 that no other carriers are available to the UE, based on base station settings and/or UE information, the eNB 404 sends S-440 a RRC connection reconfiguration message to the UE 402, including configuration of a carrier for which system information was broadcasted in S-410.

Since there is no SCC available to the UE 402, the eNB 404 sends S-442 a RRC scheduling assignment on said sole carrier.

Figure 5:
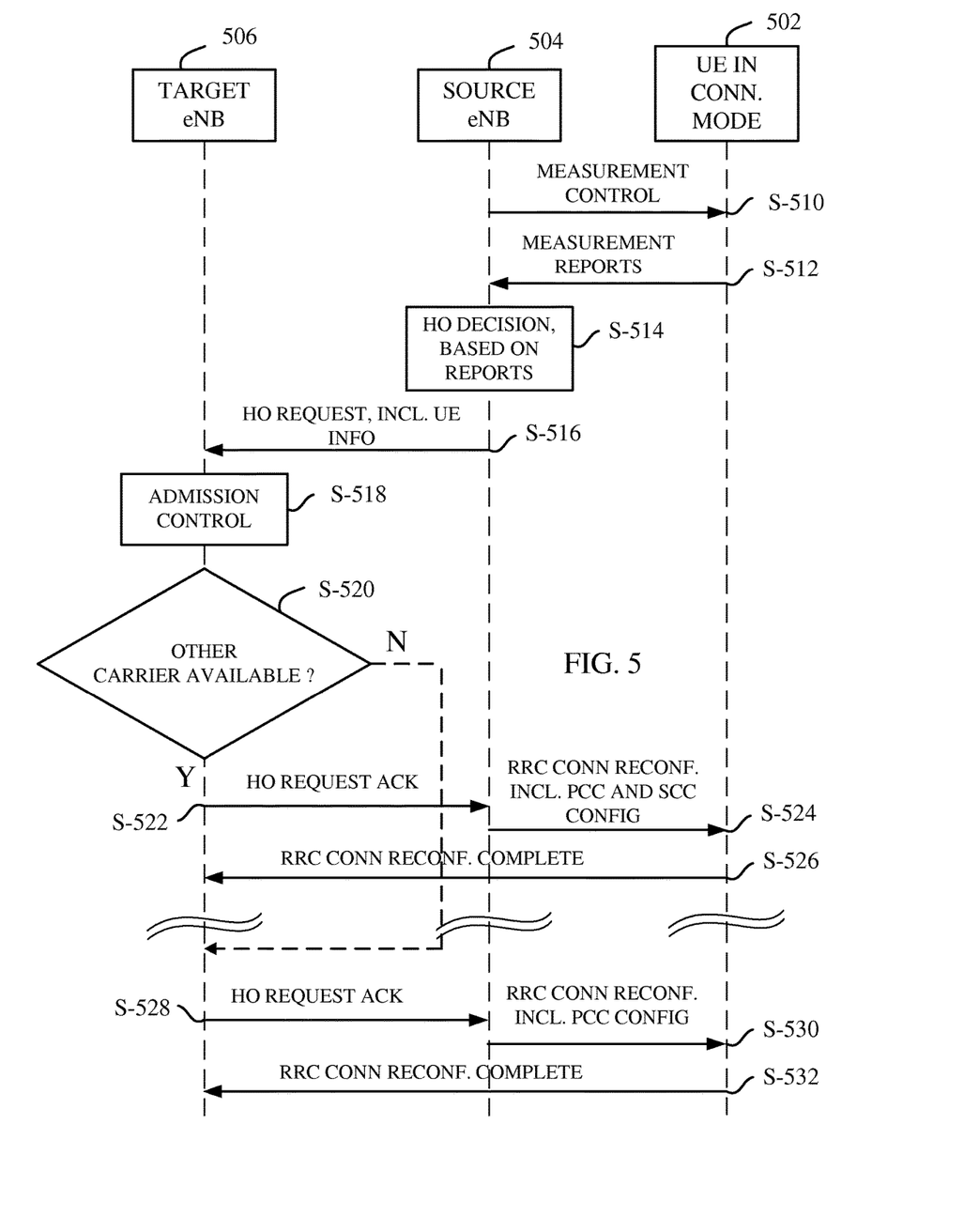

FIG. 5 presents a signaling-type diagram related to some other embodiments of this disclosure. Signaling is performed between a target eNB 506, a source eNB 504 and an UE 502, where the UE is in RRC connected mode.

In S-510 the source eNB 504 sends a measurement control message to the UE 502. In response, the UE 502 sends S-512 measurement reports to the source eNB 504. The source eNB 504 now takes a handover decision S-514 based on said measurement reports. If the source NB 504 decides that another eNB may serve the UE 502 with better performance, the source eNB 504 subsequently sends S-516 handover request, including UE information to a target eNB 506. The target eNB 506 now clears S-518 the UE admission to be served by the target eNB 506. Thereafter, it is determined S-520 by the target eNB 506 whether at least one other carrier is available to the UE 502 based on base station settings and/or UE information.

If at least one other carrier is available to the UE 502, the target eNB 506 sends S-522 a Handover (HO) request acknowledgement to the source eNB 504, after which the source eNB 504 sends S-524 a RRC connection reconfiguration message including PCC and SCC configurations to the UE 502. The UE then responses by sending S-526 a RRC connection reconfiguration complete message to the target eNB 506, completing the handover procedure.

If the target eNB 506 determines in S-520 that no other carrier is available to the UE 502, the target eNB 506 sends S-528 a HO acknowledgement to the source eNB 504, after which the source eNB 504 sends S-530 a RRC connection reconfiguration message to the UE 502. The message includes configuration of the carrier that corresponds to the cell of the target eNB, the cell of which the UE is located in.

The UE then responses by sending S-532 a RRC connection reconfiguration complete message to the target eNB 506, completing the handover procedure in this case.

Figure 6:
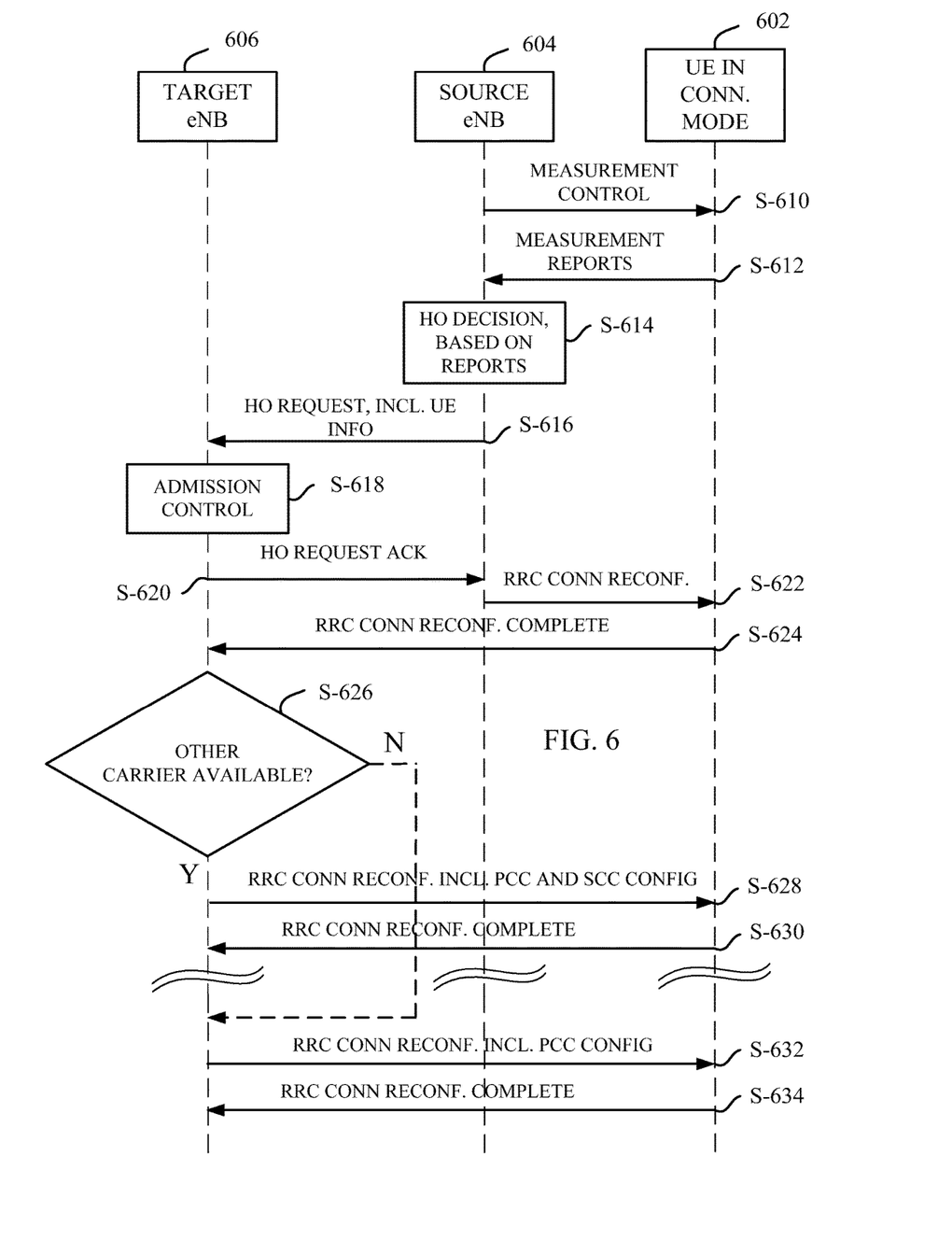

FIG. 6 presents an alternative to the signaling-type diagram as presented in FIG. 5. In FIG. 6 signaling is performed between a target eNB 606, a source eNB 604 and a UE 602 in RRC connected mode.

For the reason that the initial signaling as presented in FIG. 6 is identical to the signaling as presented in FIG. 5, reference to signaling S-510-S-518 in FIG. 5, is made for signaling S-610-S-618 in FIG. 6.

Thereafter the handover procedure is completed by first sending S-620 a HO acknowledgement by the target eNB 606 to the source eNB 604, sending S-622 a RRC connection reconfiguration message by the source eNB 604 to the UE 602, after which the UE 602 responses by sending S-624 a RRC connection reconfiguration complete to the target eNB 606.

Having completed the handover procedure, the target eNB 606 now determines S-626 whether at least one other carrier is available to the UE 602, based on BS settings and/or UE information.

When so being the case, the target eNB 606 sends S-628 a RRC connection reconfiguration message including PCC and SCC configurations to the UE 602. The UE then responses by sending S-630 a RRC connection reconfiguration complete message to the target eNB 606.

However, if the target eNB 606 determines that no other carrier is available to the UE 602 based on BS settings and/or UE information, in S-626, the target eNB 606 sends S-632 a RRC connection reconfiguration message including configuration of the carrier that corresponds to the cell of the target eNB 606, the cell of which the UE 602 is located in.

The UE 602 then responses by sending S-634 a RRC connection reconfiguration complete message to the target eNB 606.

Having described methods of embodiments and flowcharts related to embodiments of this disclosure, the base station configured for network sharing using carrier aggregation will now be described.

Figure 7:
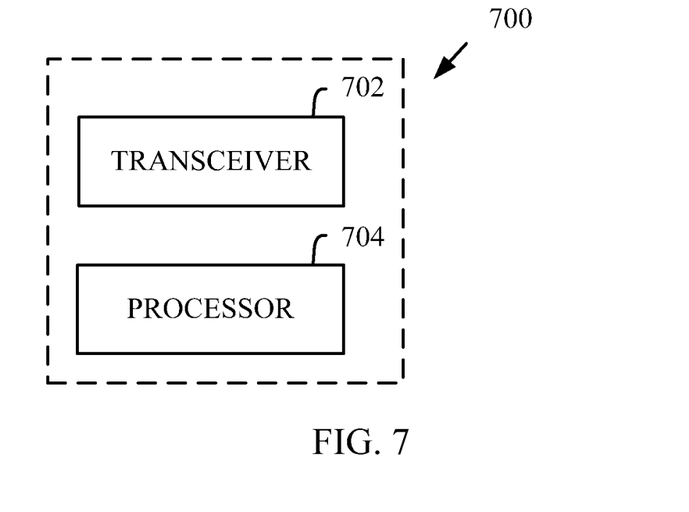
FIG. 7 schematically illustrates base station according to some embodiments of this disclosure.

FIG. 7 schematically illustrates a base station 700 for controlling of resource allocation in a multi-carrier system that comprises a multiple of cells controlled by the base station. Each cell of said multiple of cells corresponds to a carrier that is associated with a PLMN. The base station comprises a transceiver 702 that is configured to receive a UE request comprising information of a UE in a connected mode, and where a first cell of said multiple of cells corresponds to a first carrier, either comprises said UE or receives the UE in a handover procedure. The base station 700 also comprises a processor 704 that is configured to determine, based on base station settings and/or UE information, whether an other carrier associated with a different PLMN is available to said UE. When so is the case, is the transceiver 702 further configured to send a resource configuration message destined for said UE, enabling said UE to configure said other carrier as a SCC.

The base station 700 may further be configured to use a SCC having a licensed and/or a license exempt frequency range.

The SCC may also have an in-band or an out-of-band frequency range, in relation to a frequency range of the PCC.

It shall be mentioned that the UE information upon which the determination 304, S-428, S-520, S-626 by the base station whether at least one other carrier is available to the UE, based on base station settings and/or UE information is based, is either the UE information in the UE request S-424, S-516, S-616, the UE information as received from the UE S-427, or both.

It is mentioned that the UE request is either the initial UE context setup request S-424, or the HO request S-516, S-616.

The UE information on which the determination is based comprises at least one of: UE capability information, UE subscription information and UE policy information.

In the case the UE is not capable to support carrier aggregation, this will be noticed in the determination 304, S-428, S-520, S-626 for which reason the outcome of the determination is negative, "N".

If however, the UE is capable, the outcome dependent on other parameters also, may be positive, "Y", in 304, S-428, S-520, S-626.

The UE capability information may comprise the capability of the UE to support various frequency bands. UEs that are specially designed for certain regions and/or markets, may lack the capability to support frequency bands in other regions or on different markets.

The subscription to an operator by the UE may also be a factor affecting the outcome of the determination 304, S-428, S-520, S-626. For instance, using a premium subscription, carrier aggregation may be allowed, whereas by using a basic or budget subscription supporting lower peak-rates, more reduced coverage and reduced performance only, carrier aggregation would not be allowed.

In additional to the functionality described in the embodiments above the base station supporting network sharing using carrier aggregation could be configured with policies from base station settings governing under what conditions it is allowed for a UE belonging to one operator or PLMN to use resources associated with another operator or PLMN.

UE device or subscription based policies are potential factors based upon which the base station determines whether at least one other carrier, belonging to an operator different from the operator of the potential PCC, is available to the UE, in 304, S-428, S-520, S-626. UE device and subscription based policies comprise information on that some UEs are allowed to use resources from two or more PLMNs. In this case the base station is informed about the subscription, for example, using the subscriber profile ID, or Radio Access Type/Frequency selection priority index values that may be forwarded to the RAN, i.e. eNB or Node B from the CN.

The BS settings upon which the determination 304, S-428, S-520, S-626 may be based are obtained by the base station prior to the determining 304, S-428, S-520, S-626 whether at least one other carrier belonging to an other operator is available to the UE.

The BS settings upon which the determination 304, S-428, S-520, S-626 may be based, may be received from an operator of a PLMN.

The BS settings upon which the determination 304, S-428, S-520, S-626 may be based, may also comprise BS policy settings, comprising at least one of: load based policy settings, charging based policies and equal use policies.

For instance, the load based policies may comprise policies for using a certain PLMN, based on load information about a different PLMN. The resource usage may be based on the load of each PLMN. For instance usage of the other PLMN is allowed if the load of that PLMN is below a threshold, or if the load of a first PLMN is above a threshold. In this case the base station is configured with the needed thresholds for each PLMN.

Charging based policies comprise policies for how usage of uplink and/or downlink resources on a PLMN is charged between multiple operators sharing said PLMN and said SCC. This could involve that the base station logs the usage of shared resources for UEs belonging to various operators and where the operator that uses most shared resources compensates the other operator.

Equal use policies further comprise policies for each operator to use a fair amount of resources or roughly an equal amount of uplink and/or downlink resources on said SCC being shared between multiple operators. These types of policies may thus be configured in the base station, via base station settings, using an operation and maintenance system/interface, or be hard coded in the base station software. For this purpose, the different operators need to agree on which policies are to be used in a particular scenarios and then this information needs to be configured in the base stations. As multiple operators are part of the process, new measures may be needed.

One possibility is to use a new combined management system which all operators use to access the base stations. Another possibility would be that the base station has operation and maintenance interfaces to all the relevant operators. When one operator attempts to change a setting in a shared base station, the base station requests also the other operators for an acknowledgement that the change is acceptable.

The base station may receive the base station settings sent from an Operation, Administration and Maintenance, OAM, system. The OAM system may be either a PLMN individual OAM system or an OAM system that is common to one or more PLMNs, where the PLMNs are associated with the PCC or said at least one SCC.

In addition to the configuration of said policies, the base station will also be configured with operator or PLMN specific broadcast parameters which will be broadcasted on the broadcast channel of the carrier associated with that operator or PLMN. The parameter configuration for each carrier may either be received from a common operation and maintenance system or from a separate operation and maintenance system for each operator or PLMN.

In addition to the functionality above the base station supporting network sharing using carrier aggregation may support detailed logging of the resources usage for the shared and non-shared resources. There logs may be provided to the operation and maintenance system as well as the charging systems in order to support network monitoring, charging etc.

It may be noted that the cross-PLMN load will impact the load measures transferred via X2, S1 and Iu, since the current 3GPP definitions do not account for the multi-PLMN situation.

Embodiments of this disclosure have the following advantages:

Embodiments of this disclosure provide network sharing using carrier aggregation for macro base stations, such as eNBs and NBs, as well as for home NBs and home eNBs. This is advantageous since it opens up for new business cases where third party operators deploy networks of base stations which may be shared by multiple operators.

Further, technical advantageous are better coverage, peak rates and capacity, without suffering from the drawbacks of existing RAN sharing techniques.

It must be emphasized that this disclosure may be varied in many ways.

The elements of an embodiment of this disclosure may be physically, functionally and logically implemented in any suitable way. Indeed, the functionality may be implemented in a single unit, in a plurality of units or as part of other functional units. As such, this disclosure may be implemented in a single unit, or may be physically and functionally distributed between different units and processors.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although this disclosure has been described above with reference to (a) specific embodiment(s), it is not intended to be limited to the specific form set forth herein. Rather, this disclosure is limited only by the accompanying claims and, other embodiments than the specific above are equally possible within the scope of these appended claims.

The invention claimed is:

1. A method, in a base station, for controlling resource allocation in a multi-carrier system that comprises a multiple of cells controlled by the base station, where each cell of said multiple of cells corresponds to a carrier that is associated with a respective Public Land Mobile Network (PLMN), the method comprising:

receiving, on a first carrier, a User Equipment (UE) request comprising information of a UE in a connected mode, where a first cell of said multiple of cells corresponds to said first carrier associated with a first PLMN, wherein the first cell either comprises the UE or receives the UE in a handover procedure, and wherein said first carrier is used as a Primary Component Carrier (PCC);

determining, based on base station settings and the UE information, whether another carrier that corresponds to a second cell of said multiple of cells and associated with a respective PLMN differing from said first PLMN is available to said UE, wherein said another carrier is used as a Secondary Component Carrier (SCC), wherein the base station settings comprise: load based policy settings, charging based policies, and equal use policies, and wherein the UE information comprises at least one of: UE capability information, UE subscription information, and UE policy information; and responsive to determining that said another carrier is available to said UE, sending, to said UE, a resource configuration message for configuration of said PCC and said SCC, enabling said UE to use said SCC in addition to said PCC, wherein said another carrier is used as said SCC for the first PLMN and the respective PLMN.

2. The method of claim 1, further comprising sending an uplink scheduling assignment, or a downlink scheduling assignment, or both, for resource allocation on said SCC.

3. The method of claim 2, wherein sending the uplink scheduling assignment or the downlink scheduling assignment, comprises sending the uplink and/or the downlink scheduling assignment on said PCC for resource allocation on said SCC.

4. The method of claim 1, further comprising sending downlink data on said SCC or receiving uplink data on said SCC, or both, subsequent to sending the resource configuration message.

5. The method of claim 1, wherein receiving the UE request comprises receiving an initial UE context setup request from a core network.

6. The method of claim 5, further comprising receiving said UE information from the UE, wherein said UE information is either information of the UE in the initial UE context setup request, the UE information as received from the UE, or both.

7. The method of claim 1, wherein receiving the UE request comprises receiving a handover request from a source base station.

8. The method of claim 7, wherein sending, to the UE, the resource configuration message for configuration of said PCC and said SCC, comprises sending the resource configuration message via the source base station to the UE.

9. The method of claim 1, further comprising obtaining said base station settings prior to determining whether said another carrier that corresponds to said second cell of said multiple of cells is available to said UE.

10. The method of claim 1, further comprising receiving base station setting information that is sent from an operator of said first PLMN, wherein determining whether said another carrier is available to said UE is further based on the received base station setting information.

11. A base station for controlling resource allocation in a multi-carrier system that comprises a multiple of cells controlled by the base station, where each cell of said multiple of cells corresponds to a carrier that is associated with a respective Public Land Mobile Network (PLMN), said base station comprising:

a transceiver configured to receive, on a first carrier, a User Equipment (UE) request comprising information of a UE in a connected mode, where a first cell of said multiple of cells corresponds to said first carrier associated with a first PLMN, wherein the first cell either comprises the UE or receives the UE in a handover procedure, wherein said first carrier is used as a Primary Component Carrier (PCC); and a processor configured to:

determine, based on base station settings and the UE information, whether another carrier that corresponds to a second cell of said multiple of cells and associated with a respective PLMN differing from said first PLMN is available to said UE, wherein said another carrier is used as a Secondary Component Carrier (SCC), wherein the base station settings comprise: load based policy settings, charging based policies, and equal use policies, and wherein the UE information comprises at least one of: UE capability information, UE subscription information, and UE policy information; and responsive to a determination that said another carrier is available to said UE, control the transceiver to send, to said UE, a resource configuration message for configuration of said PCC and said SCC, to enable said UE to use said SCC in addition to said PCC, wherein said another carrier is used as said SCC for the first PLMN and the respective PLMN.

12. The base station according to claim 11, wherein the UE capability information comprises information on a capability of the UE to communicate with said base station over said SCC.

13. The base station according to claim 11, wherein said base station settings comprise hard coded base station settings.

14. The base station according to claim 13, wherein said base station settings comprise base station policy settings.

15. The base station according to claim 11, wherein the load based policy settings comprise policies for using a PLMN, based on load information about another PLMN.

16. The base station according to claim 11, wherein the charging based policies comprise policies for how usage of uplink and/or downlink resources on a PLMN is charged between multiple operators of said PLMN, and wherein said SCC is shared between said multiple operators.

17. The base station according to claim 11, wherein the equal use policies comprise policies for each operator from multiple operators of a PLMN to use an equal amount of uplink and/or downlink resources on said SCC that is shared between said multiple operators.

18. The base station according to claim 11, wherein said SCC has a licensed and/or a license-exempt frequency range.

19. The base station according to claim 11, wherein said SCC has an in-band or an out-of-band frequency range, in relation to a frequency range of the PCC.

20. The base station according to claim 11, wherein the base station is either a Node B, an evolved Node B, a home Node B, or a home evolved Node B.

* * * * *